US007597069B2

(12) United States Patent
Ashida

(10) Patent No.: US 7,597,069 B2
(45) Date of Patent: Oct. 6, 2009

(54) SNOW VEHICLE

(75) Inventor: Takashi Ashida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/756,798

(22) Filed: Jun. 1, 2007

(65) Prior Publication Data

US 2007/0221146 A1 Sep. 27, 2007

Related U.S. Application Data

(63) Continuation of application No. 11/320,007, filed on Dec. 28, 2005, now Pat. No. 7,255,068.

(51) Int. Cl.
*F01P 7/14* (2006.01)
*F01P 1/06* (2006.01)
*F02F 1/10* (2006.01)
*B62M 27/00* (2006.01)

(52) U.S. Cl. ................ 123/41.1; 123/41.31; 123/41.72; 165/41; 180/190

(58) Field of Classification Search ................ 123/41.1, 123/41.54, 41.44, 41.33, 41.72, 196 AB; 180/190
See application file for complete search history.

(56) References Cited

U.S. PATENT DOCUMENTS 4,337,733 A * 7/1982 Hirata et al. ............... 123/41.1
4,499,866 A * 2/1985 Hirano .................... 123/41.21
4,930,455 A * 6/1990 Creed et al. ................ 123/41.1
5,115,771 A * 5/1992 Ozawa .................... 123/41.72
6,644,261 B2 * 11/2003 Morii et al. ............. 123/195 R
6,880,660 B1 * 4/2005 Berg et al. .................. 180/190
7,080,704 B1 * 7/2006 Kerner et al. .............. 180/68.1
7,255,068 B2 * 8/2007 Ashida ...................... 123/41.1
2004/0134702 A1 * 7/2004 Karpik ....................... 180/190
2004/0237927 A1 * 12/2004 Morii et al. .............. 123/193.5
2004/0238252 A1 * 12/2004 Weinzierl ................... 180/190
2006/0213460 A1 * 9/2006 Aoki et al. ............... 123/41.05

OTHER PUBLICATIONS

Takashi Ashida; "Snow Vehicle"; U.S. Appl. No. 11/320,007, filed Dec. 28, 2005.

* cited by examiner

*Primary Examiner*—Michael Cuff
*Assistant Examiner*—Ka Chun Leung
(74) *Attorney, Agent, or Firm*—Keating & Bennett, LLP

(57) ABSTRACT

A snow vehicle includes an engine, a track belt arranged on a rear side of the engine, and a cooling water path for cooling the engine, in which the engine includes a cooling water inlet portion and a cooling water outlet portion provided on a front surface side of the engine and connected with the cooling water path. The snow vehicle is capable of improving the turning ability of the vehicle, while simplifying a cooling water path and reducing the size of the structure for cooling the engine.

16 Claims, 9 Drawing Sheets

SNOW VEHICLE

This application is a Continuation Application of U.S. patent application Ser. No. 11/320,007 filed Dec. 28, 2005, currently pending.

BACKGROUND OF THE INVENTION

1. Field of the Invention

The present invention relates to a snow vehicle, particularly to a snow vehicle having a cooling water path for cooling an engine.

2. Description of the Related Art

A snow vehicle having a cooling water path for cooling an engine is known. Such a snow vehicle is disclosed in, for example, U.S. 2004/0237927.

U.S. 2004/0237927 discloses a snow vehicle including an engine, a cooling water introducing hose for cooling an engine and a cooling water discharging hose, a cooling water inlet arranged at a front surface of the engine and connected to the cooling water introducing hose, and a cooling water outlet arranged at a rear surface of the engine and connected to the cooling water discharging hose.

According to the snow vehicle disclosed in U.S. 2004/0237927, the cooling water outlet connected to the cooling water discharging hose is arranged at the rear surface of the engine and therefore, it is difficult to arrange the engine closer to a rear side of the vehicle by any appreciable amount. As a result, it is difficult to make a gravitational center of the engine close to a gravitational center of the snow vehicle, which is normally arranged on the rear side of the engine, and therefore there is a drawback in that it is difficult to improve turning ability of the vehicle.

As a result, there has been disclosed a snow vehicle provided with a cooling water inlet portion and a cooling water outlet portion of an engine at a portion other than a rear surface of the engine. Such a snow vehicle is disclosed in, for example, U.S. Pat. No. 6,644,261.

U.S. Pat. No. 6,644,261 discloses a snow vehicle having an engine, a cooling water hose for cooling the engine, a cooling water inlet portion arranged at a front surface of the engine and connected to the cooling water hose, and a cooling water outlet portion arranged on a left side of the engine in an advancing direction of the vehicle and connected to the cooling water hose. The cooling water hose is connected to the cooling water inlet portion arranged at the front surface of the engine by passing a right side of the engine from the cooling water outlet portion arranged on the left side surface of the engine by way of a heat exchanger arranged on a rear side of the engine.

However, according to the snow vehicle disclosed in U.S. Pat. No. 6,644,261, the cooling water hose is connected to the cooling water inlet portion arranged at the front surface of the engine by passing the rear side and the right side of the engine from the cooling water outlet portion arranged at the left side surface of the engine and therefore, the cooling water hose is liable to be long. Therefore, this poses a problem in that it is difficult to simplify the cooling water hose and miniaturize a cooling structure of the engine.

SUMMARY OF THE INVENTION

In order to overcome the problems described above, preferred embodiments of the present invention provide a snow vehicle that is has a simplified cooling water path and a greatly improved turning capability and a reduced size of a structure for cooling the engine.

According to a first preferred embodiment of the invention, a snow vehicle includes an engine, a track belt arranged on a rear side of the engine, and a cooling water path for cooling the engine, wherein the engine includes a cooling water inlet portion and a cooling water outlet portion provided on a front surface side of the engine and connected with a cooling water path.

According to the snow vehicle of the present preferred embodiment, as described above, by providing the cooling water inlet portion and the cooling water outlet portion connected with the cooling water path on the front surface side of the engine, in comparison with a case of arranging the cooling water inlet portion and the cooling water outlet portion connected with the cooling water path on a rear surface side of the engine, the engine can be arranged further to the rear of the vehicle. Thereby, the gravitational center of the engine can be arranged toward the rear of the vehicle and therefore, the gravitational center of the engine can be close to or at the gravitational center of the snow vehicle, which is normally located at the rear of the engine. As a result, the turning capability of the snow vehicle is increased and greatly improved. Further, by providing the cooling water inlet portion and the cooling water outlet portion connected with the cooling water path on the front surface side of the engine, the cooling water inlet portion and the cooling water outlet portion can be arranged to be proximate to each other and therefore, the pipes of the cooling water path for connecting the cooling water inlet portion and the cooling water outlet portion can be simplified and a structure for cooling the engine can be greatly reduced in size.

In the snow vehicle according to the present preferred embodiment, preferably, the snow vehicle further includes a thermostat connected to the cooling water path for controlling a path of passing cooling water according to a temperature of the cooling water. The cooling water path includes a bypass path in which the cooling water is controlled to pass therethrough by the thermostat when the water temperature of the cooling water is lower than a predetermined temperature and does not pass through a cooler for cooling the cooling water, and the bypass path of the cooling water path is arranged on the front surface side of the engine. When arranged in this way, in comparison with a case of arranging the bypass path of the cooling water path on the rear surface side of the engine, the engine can easily be arranged further toward the rear of the vehicle. Further, in the structure of providing the cooling water inlet portion and the cooling water outlet portion on the front surface side of the engine, by providing the bypass path which does not pass the cooler on the front surface side of the engine, the bypass path of the cooling water path can be near the cooling water inlet portion and the cooling water outlet portion and therefore, the pipes defining the bypass path of the cooling water path can more easily be simplified.

In the snow vehicle according to the present preferred embodiment, preferably, the engine further includes a cylinder, and an intake path and an exhaust path connected to the cylinder, wherein the intake path is arranged on the front surface side of the engine, and the exhaust path is arranged on the rear surface side of the engine. When arranged in this way, the intake pipe and an air cleaner connected to the intake path can be arranged on the front side of the engine and therefore, in comparison with the case of arranging the intake pipe and the air cleaner on the rear surface side of the engine, the engine can more easily be arranged further toward the rear side of the vehicle.

In the snow vehicle according to the present preferred embodiment, preferably, the engine further includes a plurality of cylinders, and the cooling water inlet portion of the engine is arranged such that the cooling water flows between axis lines of two predetermined cylinders in a direction of alignment of the plurality of cylinders. When arranged in this way, cooling water can be distributed uniformly to the plurality of cylinders and therefore, the plurality of the cylinders can more easily be uniformly cooled.

In the snow vehicle according to the present preferred embodiment, preferably, the snow vehicle further includes a reservoir tank connected to the cooling water path, wherein the engine further includes a cylinder and a path connected to the cylinder and arranged on the front surface side of the engine. The reservoir tank is arranged on an upper side of a portion of the engine and connected to an area outside of the path, and the cooling water outlet portion of the cooling water path is arranged on a lower side of the portion connecting the engine to the outside of the path. When arranged in this way, the reservoir tank can be arranged at a position that is higher than the cooling water outlet portion and therefore, bubbles passing through the cooling water outlet portion can more easily reach the reservoir tank. Thereby, bubbles of the cooling water path can more easily be removed.

In the snow vehicle having the reservoir tank, preferably, the path of the engine is an intake path. When arranged in this way, the intake path can be arranged on the front surface side of the engine and therefore, the intake pipe and the air cleaner connected to the intake path can be more easily arranged on the front side of the engine. Thereby, the engine can be arranged further toward the rear side of the vehicle by making the intake pipe and the air cleaner more easily arranged on the front side of the engine while making bubbles in the cooling water path more easily removed by the reservoir tank arranged at the position higher than the cooling water outlet portion.

In the snow vehicle according to the present preferred embodiment, preferably, the snow vehicle further includes a radiator connected to the cooling water path, wherein the radiator is arranged on the front surface side of the engine. When arranged in this way, in comparison with a case of arranging the radiator and the cooling water path connected to the radiator on the rear surface side of the engine, the engine can be more easily arranged further toward the rear side of the vehicle.

In the snow vehicle according to the present preferred embodiment, preferably, the engine further includes a water pump for supplying the cooling water to the cooling water path, wherein the water pump is arranged on the front surface side of the engine. When arranged in this way, in comparison with a case of arranging the water pump on the rear surface side of the engine, the engine can more easily be arranged further toward the rear side of the vehicle.

In the snow vehicle in which the engine includes the water pump, preferably, a portion of the cooling water path for connecting the water pump and the cooling water inlet portion of the engine is arranged on the front surface side of the engine. When arranged in this way, in comparison with a case of arranging the portion of the cooling water path connecting the water pump and the cooling water inlet portion on the rear surface side of the engine, the engine can further easily be arranged toward the rear side of the vehicle.

In the snow vehicle in which the engine includes the water pump, preferably, the water pump is arranged on an outer side in a vehicle width direction of the engine. When arranged in this way, a portion of the cooling water path for connecting the radiator and the water pump arranged outside of the engine can be shortened and therefore, the cooling water path can further be simplified.

In the snow vehicle in which the engine includes the water pump, preferably, the engine further includes a crankshaft, and the water pump is transmitted with a drive force from the crankshaft. When arranged in this way, the crankshaft can define a drive source of the water pump and therefore, in comparison with a case of separately providing the drive source for driving the water pump, the number of parts can be reduced and a light-weight and small-size engine can be achieved.

In the snow vehicle according to the present preferred embodiment, preferably, the snow vehicle further includes an oil cooler connected to the cooling water path, wherein the oil cooler is arranged on the front surface side of the engine. When arranged in this way, in comparison with a case of arranging the oil cooler on the rear surface side of the engine, the engine can more easily be arranged further toward the rear side.

In the snow vehicle according to the present preferred embodiment, preferably, the snow vehicle further includes a thermostat and a reservoir tank connected to the cooling water path, wherein both the thermostat and the reservoir tank are arranged on either one of left and right sides in a running direction of the vehicle. When arranged in this way, the thermostat and the reservoir tank can be arranged proximate to each other and therefore, the pipes defining a cooling water path connecting the thermostat and the reservoir tank can easily be simplified and the structure for cooling the engine can easily be downsized.

In the snow vehicle according to the present preferred embodiment, preferably, the engine further includes a cylinder and a cooling water jacket arranged at least at an upper portion and a side portion of the cylinder and functioning as a path of the cooling water at an inner portion of the engine. The cooling water outlet portion of the engine is provided on an upper side of the cooling water inlet portion and cooling water supplied from the cooling water inlet portion arranged on the front surface side of the engine to the inner portion of the engine is passed from a lower portion to an upper portion of the cooling water jacket and discharged to the cooling water path by way of the cooling water outlet portion arranged on the front surface side of the engine. The cooling water passing from the lower portion to the upper portion of cooling water jacket is restricted such that an amount of the cooling water passing through the rear portion of the cooling water jacket becomes larger than an amount of the cooling water passing through the front portion of the cooling water jacket. When arranged in this way, cooling water can be made to pass through the front portion and the rear portion of the lower portion of the cooling water jacket and the rear portion and the front portion of the upper portion of the cooling water jacket provided inside of the engine and therefore, the total engine can be more easily cooled.

In the snow vehicle according to the present preferred embodiment, preferably, the front portion and the rear portion of the cooling water jacket are respectively provided with a first passing hole and a second passing hole for connecting the upper portion and the lower portion of the cooling water jacket, wherein the second passing hole is provided with an area that is larger than an area of the first passing hole. When arranged in this way, an amount of cooling water passing through the second passing hole of the cooling water jacket can be larger than an amount of cooling water passing through the first passing hole of the cooling water jacket. Therefore, when cooling water is made to pass from the lower portion to the upper portion of the cooling water jacket, the amount of cooling water passing through the rear portion of the cooling water jacket can easily be larger than the amount of cooling water passing through the front portion of the cooling water jacket.

In the snow vehicle according to the present preferred embodiment, preferably, the engine is arranged to be inclined toward the rear side of the vehicle. When arranged in this way, the gravitational center of the engine can be arranged further toward the rear side and therefore, the gravitational center of the engine can be even closer to the gravitational center of the snow vehicle. Thereby, the turning capability of the vehicle is even more improved.

In the snow vehicle according to the present preferred embodiment, preferably, the engine is a four stroke engine. According to the four stroke engine, the engine is liable to be large since the engine needs a starter motor or other parts. Therefore, it is particularly effective to apply the present invention to simplify the cooling water path and to improve and expand the turning capability while reducing the size of the structure for cooling the engine.

According to a second preferred embodiment of the invention, a snow vehicle including an engine, a track belt arranged on a rear side of the engine, and a cooling water path for cooling the engine, wherein the engine includes a cylinder, an intake path and an exhaust path connected to the cylinder and a cooling water inlet portion and a cooling water outlet portion connected with a cooling water path, the intake path is arranged on a front surface side of the engine, the exhaust path is arranged on a rear surface side of the engine, and the cooling water inlet portion and the cooling water outlet portion are arranged on a side of the intake path.

In the snow vehicle according to the second preferred embodiment of the invention, as described above, by providing the intake path on the front surface side of the engine and arranging the cooling water inlet portion and the cooling water outlet portion on a side of the intake path, in comparison with a case of arranging the cooling water inlet portion and the cooling water outlet portion connected with the cooling water path on the rear surface side of the engine, the engine can be arranged further toward the rear side of the vehicle. Thereby, the gravitational center of the engine can be arranged on the rear side and therefore, the gravitational center of the engine can be very close to the gravitational center of the snow vehicle, which is normally arranged on the rear side of the engine. As a result, the turning capability can be improved. Further, by providing the intake path on the front surface side of the engine and arranging the cooling water inlet portion and the cooling water outlet portion on the side of the intake path, the cooling water inlet portion and the cooling water outlet portion can be arranged to be proximate to each other and therefore, pipes defining the cooling water path connected with the cooling water inlet portion and the cooling water outlet portion can be simplified and the structure for cooling the engine can be significantly reduced in size. Further, by arranging the intake path on the front surface side of the engine and arranging the exhaust path on the rear surface side of the engine, the intake pipe and the air cleaner connected to the intake path can be more easily arranged on the front side of the engine and therefore, in comparison with a case of arranging the intake pipe and the air cleaner on the rear surface side of the engine, the engine can easily be arranged further toward the rear side.

According to a third preferred embodiment of the present invention, a snow vehicle includes an engine, a track belt arranged on a rear side of the engine, a cooling water path for cooling the engine, and a reservoir tank connected to the cooling water path, wherein the engine includes a plurality of cylinders, a path connected to the plurality of cylinders and arranged on a front surface side of the engine, and a cooling water inlet portion and a cooling water outlet portion provided on the front surface side of the engine and connected with a cooling water path, the cooling water inlet portion of the engine is arranged such that cooling water flows between axis lines of two predetermined cylinders in a direction of alignment of the plurality of cylinders, the reservoir tank is arranged on an upper side of a portion of the engine connected with an outer portion of the path, and the cooling outlet portion of the cooling water path is arranged on a lower side of a portion of the engine connected to an area outside of the path.

In the snow vehicle according to the third preferred embodiment, as described above, by providing the cooling water inlet portion and the cooling water outlet portion connected with the cooling water path on the front surface side of the engine, in comparison with a case of arranging the cooling water inlet portion and the cooling water outlet portion connected with the cooling water path on the rear surface side of the engine, the engine can be arranged further toward the rear side. Thereby, the gravitational center of the engine can arranged on the rear side and therefore, the gravitational center of the engine can be made to be proximate to the gravitational center of the snow vehicle, which is normally arranged on the rear side of the engine. As a result, the turning capability of the vehicle is greatly improved. By providing the cooling water inlet portion and the cooling water outlet portion connected with the cooling water path on the front surface side of the engine, the cooling water inlet portion and the cooling water outlet portion can be arranged to be proximate to each other and therefore, pipes defining the cooling water path for connecting the cooling water inlet portion and the cooling water outlet portion can be simplified and the structure of cooling the engine can be downsized. Further, by arranging the cooling water inlet portion of the engine such that cooling water is made to flow between axis lines of the two predetermined cylinders in the direction of alignment of the plurality of cylinders, cooling water can be more easily distributed uniformly to the plurality of cylinders and therefore, the plurality of cylinders can uniformly be cooled. Further, by arranging the reservoir tank on the upper side of the portion connecting the path of the engine to the outside and arranging the cooling water outlet portion of the cooling water path on the lower side of the portion connecting the path of the engine and the outside, the reservoir tank can be arranged at a portion that is higher than the cooling water outlet portion and therefore, bubbles passing through the cooling water outlet portion can more easily reach the reservoir tank. As a result, bubbles of the cooling water path can be more easily removed.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 1:
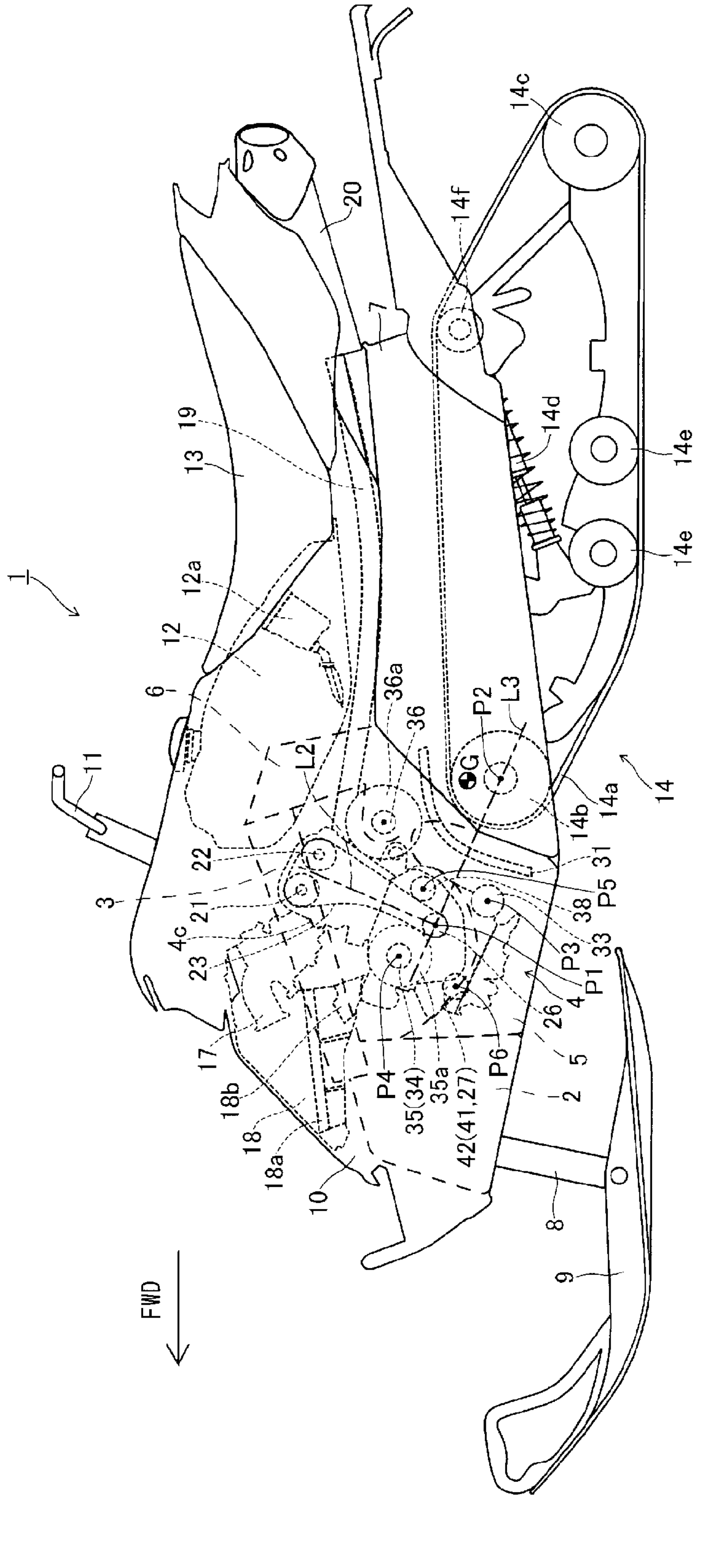
FIG. 1 is a side view showing a total structure of a snow mobile according to a first preferred embodiment of the present invention.

A detailed explanation will be given of a structure of a snow mobile 1 according to a preferred embodiment of the invention in reference to FIG. 1 through FIG. 12. Further, according to the first preferred embodiment, a snow mobile will be explained as an example of a snow vehicle of the present invention. In the drawings, an arrow mark FWD designates a front side of a running direction of the snow mobile and an arrow mark W designates a width direction of a vehicle body.

According to a snow mobile 1 according to a preferred embodiment of the present invention, as shown in FIG. 1, a front side frame 2 is arranged on a front side of a vehicle body. Further, a main frame 3 is connected to an upper portion of the front side frame 2. The main frame 3 is arranged to extend from an upper side of a four stroke engine (hereinafter, simply referred to as "engine") 4 to a rear side. Further, a lower side frame 5 is connected to a lower portion of the front side frame 2. The lower side frame 5 is arranged to extend to the rear side from a lower side of the engine 4. Further, a connecting frame 6 is connected to rear portions of the main frame 3 and the lower side frame 5. Further, a rear frame 7 is arranged at rear portions of the lower side frame 5 and the connecting frame 6. The rear frame 7 is arranged to extend to the rear side. A body frame is defined by the front side frame 2, the main frame 3, the lower side frame 5, the connecting frame 6 and the rear frame 7.

A lower side of the front side frame 2 is arranged with pairs of ski holding portions 8 and skis 9 arranged on left and right sides in the running direction FWD. The skis 9 are arranged to pivot in a left and right direction in accordance with pivoting movement of the ski holding portions 8. Further, a front cowl 10 covering a front side of the vehicle body is provided on a front side and an upper side of the front side frame 2.

An upper side of the main frame 3 is arranged with a handle 11 connected to the ski holding portions 8 for steering the skis 9. Further, an upper side of the connecting frame 6 is arranged with a fuel tank 12 having a fuel pump 12*a*.

A seat 13 is arranged on an upper side of the rear frame 7. Further, a drive track 14 is arranged on a lower side of the rear frame 7. The drive track 14 includes a track belt 14*a* preferably made of rubber, a front axle 14*b* and a rear axle 14*c* arranged on an inner side of the track belt 14*a* and a suspension 14*d* for absorbing impact. The front axle 14*b* is provided with a function of rotating the track belt 14*a* by a drive force from the engine 4. As a result, the snow mobile 1 can be driven. Further, the inner side of the track belt 14*a* is arranged with a plurality of guide wheels 14*e* and 14*f* for preventing the track belt 14*a* from slackening.

Figure 3:
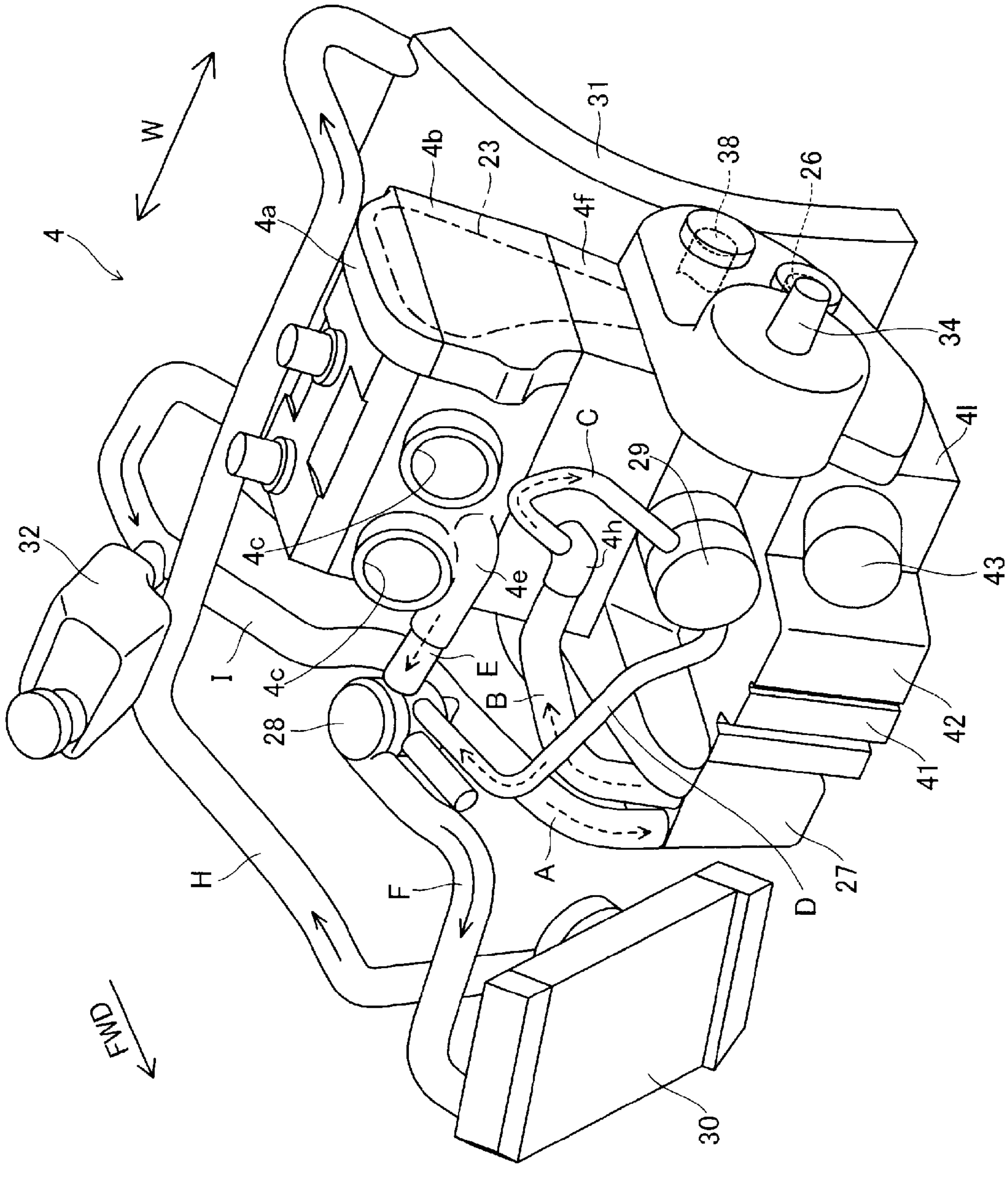
FIG. 3 is a front perspective view of the periphery of the engine of the snow mobile according to the first preferred embodiment shown in FIG. 1.
Figure 5:
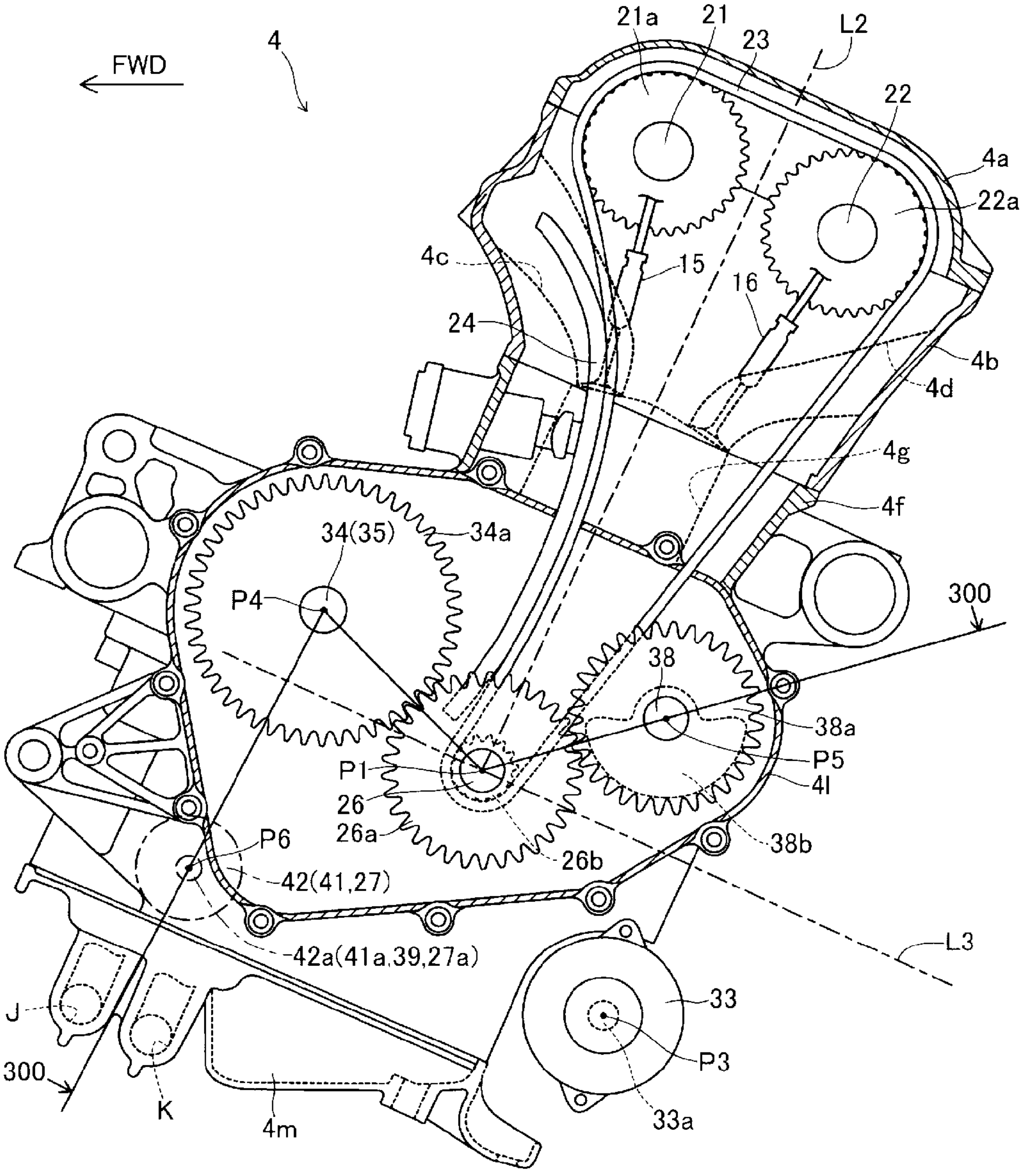
FIG. 5 is a side sectional view of the engine of the snow mobile according to the first preferred embodiment shown in FIG. 1.

Further, the engine 4 is arranged on a front upper side of the front axle 14*b*. Further, as shown in FIG. 3 and FIG. 5, the upper portion of the engine 4 is provided with a cylinder head cover portion 4*a* and a cylinder head portion 4*b*. As shown in FIG. 5, the inside of the cylinder head portion 4*b* includes an intake valve 15 and an exhaust valve 16. The intake valve 15 is provided with a function of opening and closing an intake path 4*c* and the exhaust valve 16 is provided with a function of opening and closing an exhaust path 4*d*. Further, the intake path 4*c* is an example of a "path" in the present preferred embodiment of the invention.

Figure 4:
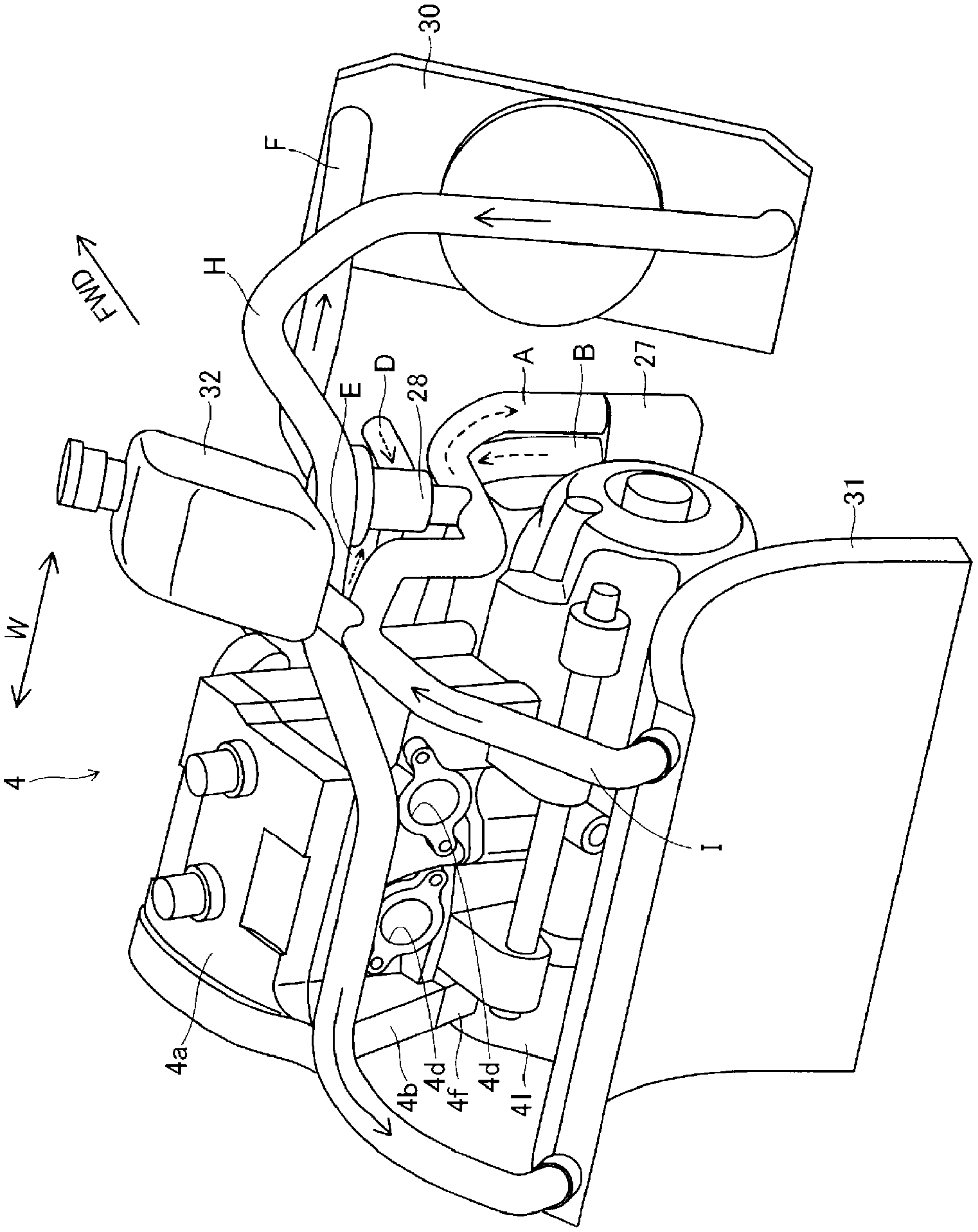
FIG. 4 is a rear perspective view of the periphery of the engine of the snow mobile according to the first preferred embodiment shown in FIG. 1.

Here, according to the present preferred embodiment, as shown in FIG. 3 and FIG. 5, the intake path 4*c* is connected to a front surface of the cylinder head portion 4*b*. Further, as shown in FIG. 4 and FIG. 5, the exhaust path 4*d* is connected to a rear surface of the cylinder head portion 4*b*.

Figure 2:
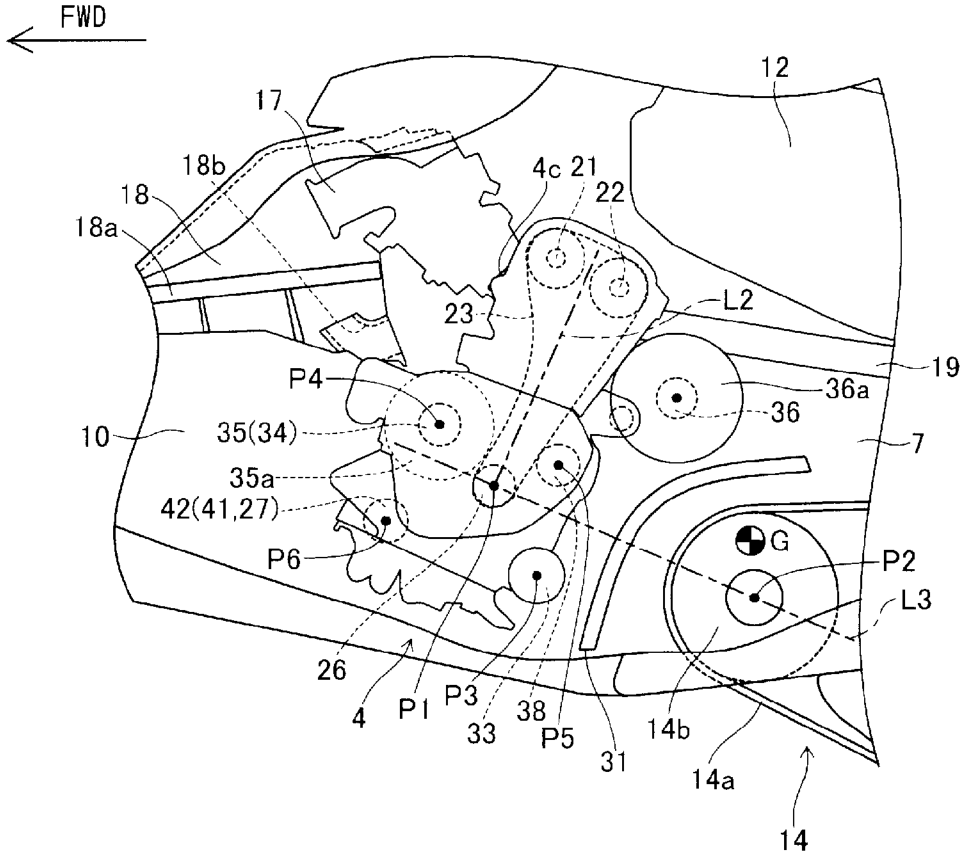
FIG. 2 is a side view of a periphery of an engine of the snow mobile according to the first preferred embodiment of the present invention.
Figure 6:
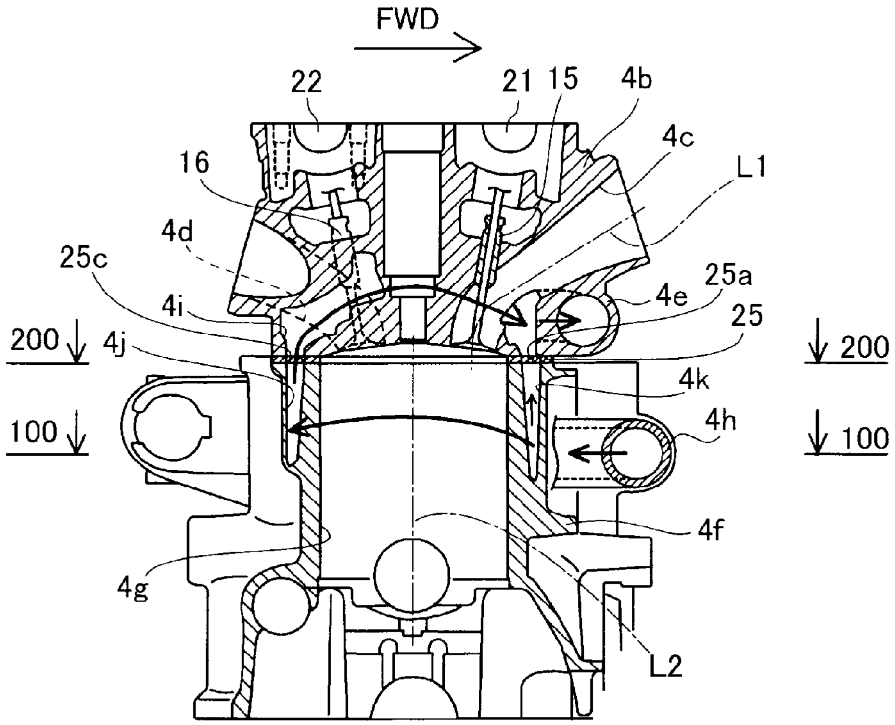
FIG. 6 is a side sectional view of a periphery of a cylinder of the engine of the snow mobile according to the first preferred embodiment shown in FIG. 1.

According to the first preferred embodiment, as shown in FIG. 6, a cooling water outlet portion 4*e*, described below, is arranged on a lower side of a center line L1 of the intake path 4*c* and on a lower side of a portion of connecting the intake path 4*c* and the intake pipe 17 (refer to FIG. 2). Further, a lower side of the intake path pipe 17 is arranged with a filter 18*a* of an air cleaner 18 for preventing snow or dirt from entering. The intake pipe 17 and the air cleaner 18 are arranged on the front side of the engine 4. Further, a portion of the air cleaner 18 on a lower side of the filter 18*a* is provided with a suction port 18*b* for sucking air from the rear side. Further, as shown in FIG. 1, the exhaust path 4*d* (refer to FIG. 5) is connected with an exhaust pipe 19. The exhaust pipe 19 is directed to the rear side by being bent to the right side in the running direction and a muffler 20 is provided at a rear portion of the exhaust pipe 19. Further, as shown in FIG. 5, upper sides of the intake valve 15 and the exhaust valve 16 are arranged with cam shafts 21, 22 for respectively controlling operation of the intake valve 15 and the exhaust valve 16. The cam shafts 21 and 22 are respectively provided with cam shaft gears 21*a* and 22*a*. A cam chain 23 is attached to the cam shaft gears 21*a* and 22*a*. Further, the cam chain 23 is applied with a tension by a cam chain tensioner 24.

Figure 7:
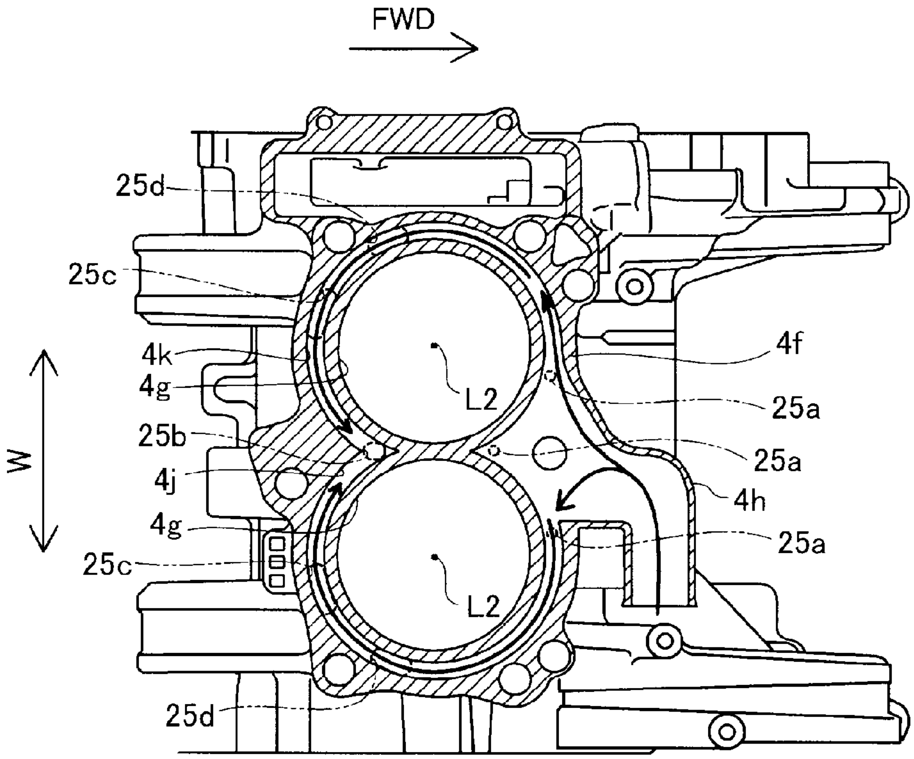
FIG. 7 is a view taken along a line 100-100 of FIG. 6.

A cylinder block portion 4*f* is arranged on a lower side of the cylinder head portion 4*b*. As shown in FIG. 6 and FIG. 7, two cylinders 4*g* are provided on an inner side of the cylinder block portion 4*f*.

Figure 8:
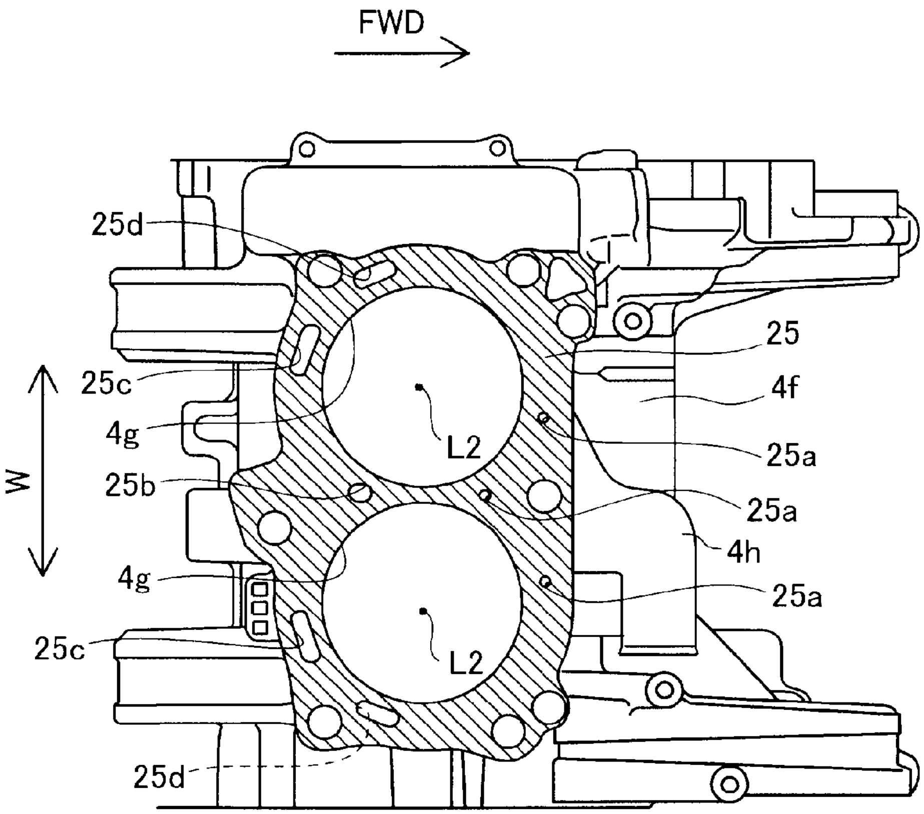
FIG. 8 is a view taken along a line 200-200 of FIG. 6.
Figure 9:
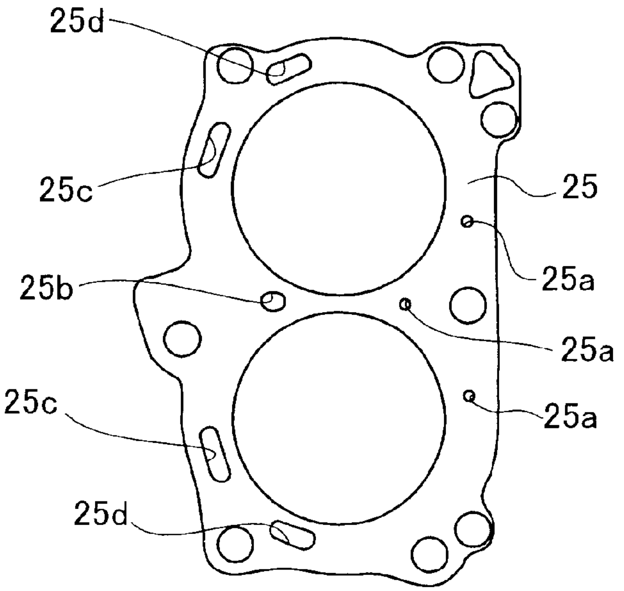
FIG. 9 is a plane view of a gasket of the snow mobile according to the first preferred embodiment shown in FIG. 1.

According to the present preferred embodiment, as shown in FIG. 7, a cooling water inlet portion 4*h* is arranged at a front surface of the cylinder block portion 4*f* such that cooling water flows between the center lines (axis lines) L2 of the two cylinders 4*g* in a direction of alignment of the two cylinders 4*g* (vehicle width direction). Further, as shown in FIG. 6, an upper portion and a side portion of the cylinder 4*g* are respectively provided with an upper water jacket 4*i* and a lower water jacket 4*j* functioning as path portions of cooling water at an inner portion of the engine 4. Further, a gasket 25 is arranged between the cylinder head portion 4*b* and the cylinder block portion 4*f* to partition the upper water jacket 4*i* and the lower water jacket 4*j*. As shown in FIG. 8 and FIG. 9, a predetermined region on a front side of the gasket 25 is provided with a passing hole 25*a* and a predetermined region on a rear side of the gasket 25 is provided with passing holes 25*b* through 25*d* having an area larger than that of the passing hole 25*a*. Further, a water jacket 4*k* is defined by the upper water jacket 4*i*, the lower water jacket 4*j* and the passing holes

Figure 10:
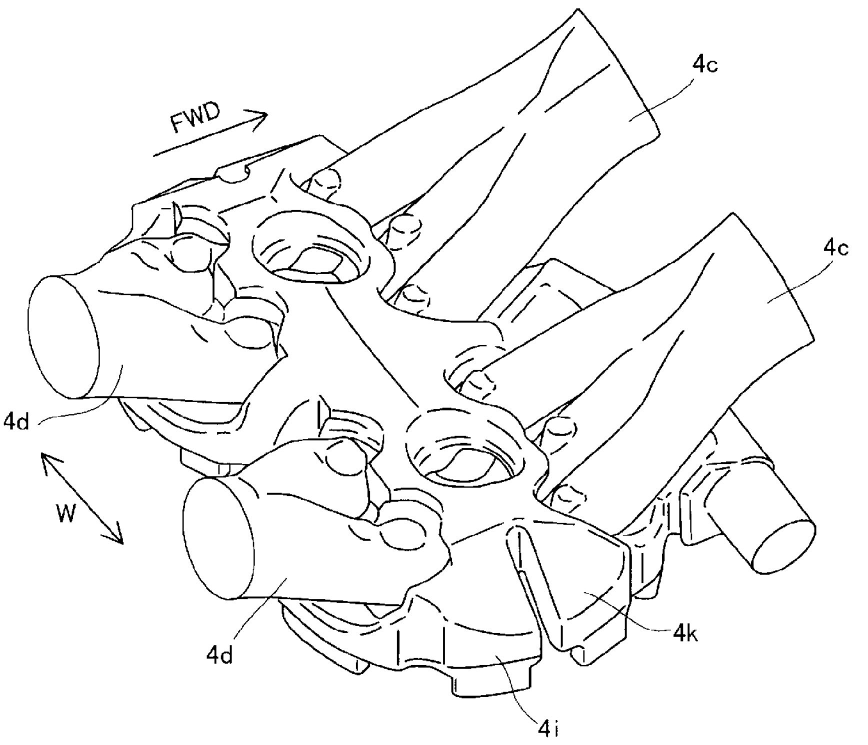
FIG. 10 is a perspective view of an intake path, an exhaust path and an upper water jacket of the snow mobile according to the first preferred embodiment shown in FIG. 1.

25*a* through 25*d*. Further, as shown in FIG. 10, the upper water jacket 4*i* is arranged to cool the exhaust path 4*d* and the intake path 4*c*.

As shown in FIG. 1, the center line L2 of the cylinder 4*g* (refer to FIG. 5) is arranged to be inclined toward the rear side and arranged to intersect substantially perpendicularly, as seen from the side of the vehicle body with a line L3 connecting a center P1 of a crankshaft 26, described below, and a center P2 of the of the front axle 14*b*. Thereby, a gravitational center of the engine 4 can be arranged toward the rear side and therefore, the gravitational center of the engine 4 can be made to be proximate to a gravitational center G of the snow mobile 1. As a result, the turning capability can be improved.

Further, as shown in FIG. 5, a crankcase portion 41 is arranged on a lower side of the cylinder block portion 4*f*. As shown in FIG. 3, a water pump 27 for supplying cooling water to the inner portion of the engine 4 is provided at an inner portion on a right side in the running direction of the vehicle on a front surface side of the crankcase portion 41. As shown in FIG. 3 and FIG. 4, the water pump 27 is connected with a cooling water path portion A connected to a thermostat 28. The thermostat 28 is arranged on the right side in the running direction on the front surface side of the engine 4 and is provided with a function of controlling a path for passing cooling water by measuring a temperature of the cooling water. Further, the water pump 27 is connected with a cooling water path portion B connected to a cooling water inlet portion 4*h* (refer to FIG. 3). The cooling water inlet portion 4*h* is connected with a cooling water path portion C (refer to FIG. 3) having a diameter smaller than that of the cooling water path portion B and connected to an oil cooler 29 (refer to FIG. 3). Further, the oil cooler 29 is connected with a cooling water path portion D connected to the thermostat 28.

The cooling water outlet portion 4*e* (refer to FIG. 3) provided at the front surface of the cylinder head portion 4*b* is connected with a cooling water path portion E connected to the thermostat 28. Further, the thermostat 28 is connected with a cooling water path portion F connected to a radiator 30. Further, the radiator 30 is an example of a "cooler" in the present preferred embodiment of the invention. The radiator 30 is arranged on the right side in the running direction on the front surface side of the engine 4 and is provided with a function of cooling passing cooling water. Further, the radiator 30 is connected with a cooling water path portion H connected to an upper portion of one end side of a heat exchanger 31. Further, the heat exchanger 31 is another example of a "cooler" of the present preferred embodiment of the invention. As shown in FIG. 2, the heat exchanger 31 is arranged between the engine 4 and the front axle 14*b*. Further, the heat exchanger 31 is provided with a function of cooling the cooling water passing through the inside of the heat exchanger 31 by snow scattered from the track belt 14*a*.

As shown in FIG. 3 and FIG. 4, a cooling water path I connected to the thermostat 28 is connected to an upper portion of the other end side of the heat exchanger 31. The cooling water path portion I is attached with a reservoir tank 32 to be arranged on an upper side of the cylinder head cover portion 4*a*. The reservoir tank 32 is arranged on the right side in the running direction. Further, the reservoir tank 32 is provided with a function of adjusting an amount of cooling water inside the engine 4 to be constant even when cooling water is expanded or contracted by a change in a temperature and taking in bubbles when bubbles are produced inside of the cooling water path portion I. According to the present preferred embodiment, by arranging the reservoir tank 32 on an upper side of the cylinder head cover portion 4*a* and arranging the cooling water outlet portion 4*e* (refer to FIG. 3) and the thermostat 28 on a lower side of the center line L1 (refer to FIG. 6) of the intake path 4*c*, an inclined angle of a portion of the cooling water path portion I connecting the reservoir tank 32 and the thermostat 28 can be made to be large and therefore, bubbles passing the cooling water path portion I and the thermostat 28 can more easily reach the reservoir tank 32.

The water pump 27 (refer to FIG. 3) is provided with a function of supplying cooling water to the cooling water path portion B to maintain the temperature of the engine 4 at a desired temperature. Specifically, as shown in FIG. 3, cooling water supplied to the cooling water path portion B is supplied to the cooling water inlet portion 4*h*. A portion of cooling water supplied to the cooling water inlet portion 4*h* is delivered to the oil cooler 29 provided at the front surface of the crankcase portion 41 by way of the cooling water path portion C. Cooling water which has cooled oil inside of the oil cooler 29 is supplied to the thermostat 28 by way of the cooling water path portion D. Further, a remaining portion of cooling water supplied to the cooling water inlet portion 4*h* is supplied to the front portion of the lower water jacket 4*j* (refer to FIG. 6) inside of the engine 4. Further, cooling water supplied to the front portion of the lower water jacket 4*j* (refer to FIG. 6) cools the cylinder head portion 4*b* and the cylinder block portion 4*f* and is supplied to the thermostat 28 by way of the cooling water outlet portion 4*e* and the cooling water path portion E.

Figure 11:
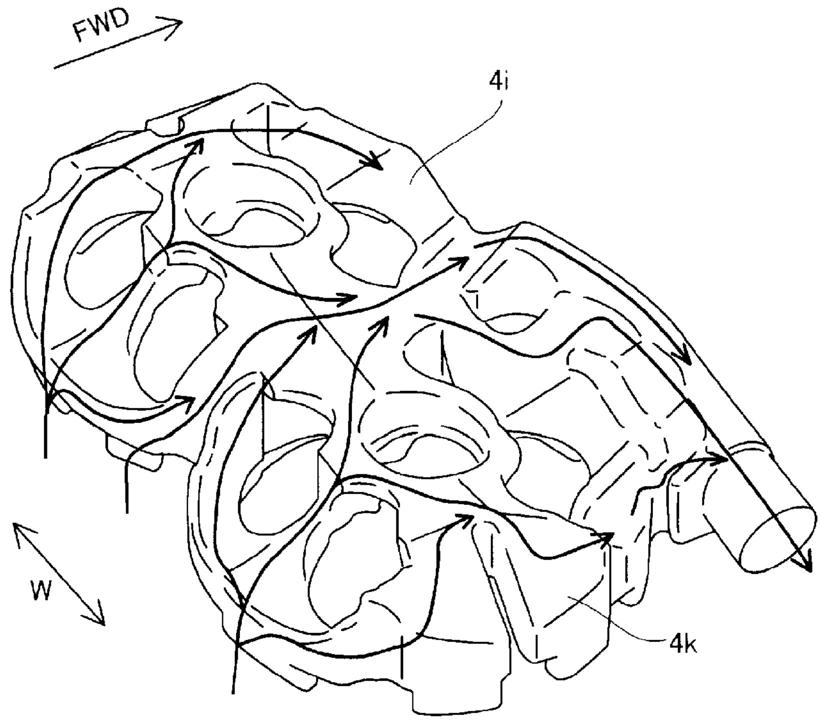
FIG. 11 is a perspective view of the upper water jacket of the snow mobile according to the first preferred embodiment shown in FIG. 1.

Specifically, as shown in FIG. 6, a portion of cooling water supplied from the cooling water inlet portion 4*h* to the front portion of the lower water jacket 4*j* is supplied to the front portion of the upper water jacket 4*i* by way of the hole 25*a* in the gasket 25. Further, as shown in FIG. 7, a remaining portion of cooling water supplied from the cooling water inlet portion 4*h* to the front portion of the lower water jacket 4*j* is supplied to the rear portion of the lower water jacket 4*j* bypassing a side portion of the cylinder 4*g*. Further, as shown in FIG. 6, cooling water supplied to the rear portion of the lower water jacket 4*j* is supplied to the rear portion of the upper water jacket 4*i* by way of the passing holes 25*b* through 25*d* of the gasket 25 (refer to FIG. 8). Further, as shown in FIG. 11, cooling water supplied to the rear portion of the upper water jacket 4*i* is supplied to the front portion of the upper water jacket 4*i* while cooling the exhaust path 4*d* (refer to FIG. 10) and the intake path 4*c* (refer to FIG. 10). According to the present preferred embodiment, as shown in FIG. 8 and FIG. 9, the passing holes 25*b* through 25*d* of the gasket 25 are arranged such that areas thereof are larger than that of the passing holes 25*a* and therefore, an amount of cooling water supplied from the rear portion of the lower water jacket 4*j* (refer to FIG. 6) to the rear portion of the upper water jacket 4*i* (refer to FIG. 6) becomes larger than an amount of cooling water supplied from the front portion of the lower water jacket 4*j* to the front portion of the upper water jacket 4*i*. Thereby, cooling water can be made to pass the front portion and the rear portion of the lower water jacket 4*j* and the rear portion and the front portion of the upper water jacket 4*i* and therefore, the total water jacket 4*k* can be cooled. Further, cooling water supplied to the front portion of the upper water jacket 4*i* (refer to FIG. 6) can be supplied to the thermostat 28 by way of the cooling water outlet portion 4*e* and the cooling water path portion E as shown in FIG. 3.

When the water temperature of the cooling water supplied to the thermostat 28 is equal to or higher than a predetermined temperature, cooling water passes the thermostat 28 and is supplied to the radiator 30 by way of the cooling water path portion F. Further, cooling water passing the radiator 30 is supplied to the heat exchanger 31 by way of the cooling water path portion H and thereafter is returned to the water pump 27 by way of the cooling water path portions I and A.

Further, when the water temperature of cooling water supplied to the thermostat 28 is lower than the predetermined temperature (for example, when starting the engine 4), cooling water passes the thermostat 28 and is returned to the water pump 27 by way of the cooling water path portion A. That is, cooling water continues circulating in the inner portion of the engine 4 and the oil cooler 29 without passing the radiator 30 and the heat exchanger 31. Further, as shown in FIG. 3, a bypass path which does not pass the cooler (the radiator 30 and the heat exchanger 31) is defined by the cooling water path portions E, A, B, C and D. Further, according to the present preferred embodiment, the bypass path including the cooling water path portions E, A, B, C and D is arranged on the front surface side of the engine 4.

As shown in FIG. 5, a starter motor 33 for starting the engine 4 is attached to a lower portion on the rear side of the crankcase portion 41. Further, the center P3 of a starter motor shaft 33a of the starter motor 33 is arranged on the lower side of the line L3 connecting the center P1 of the crankshaft 26 and the center P2 of the front axle 14*b* (refer to FIG. 1) and on the rear side of the crankshaft 26.

Figure 12:
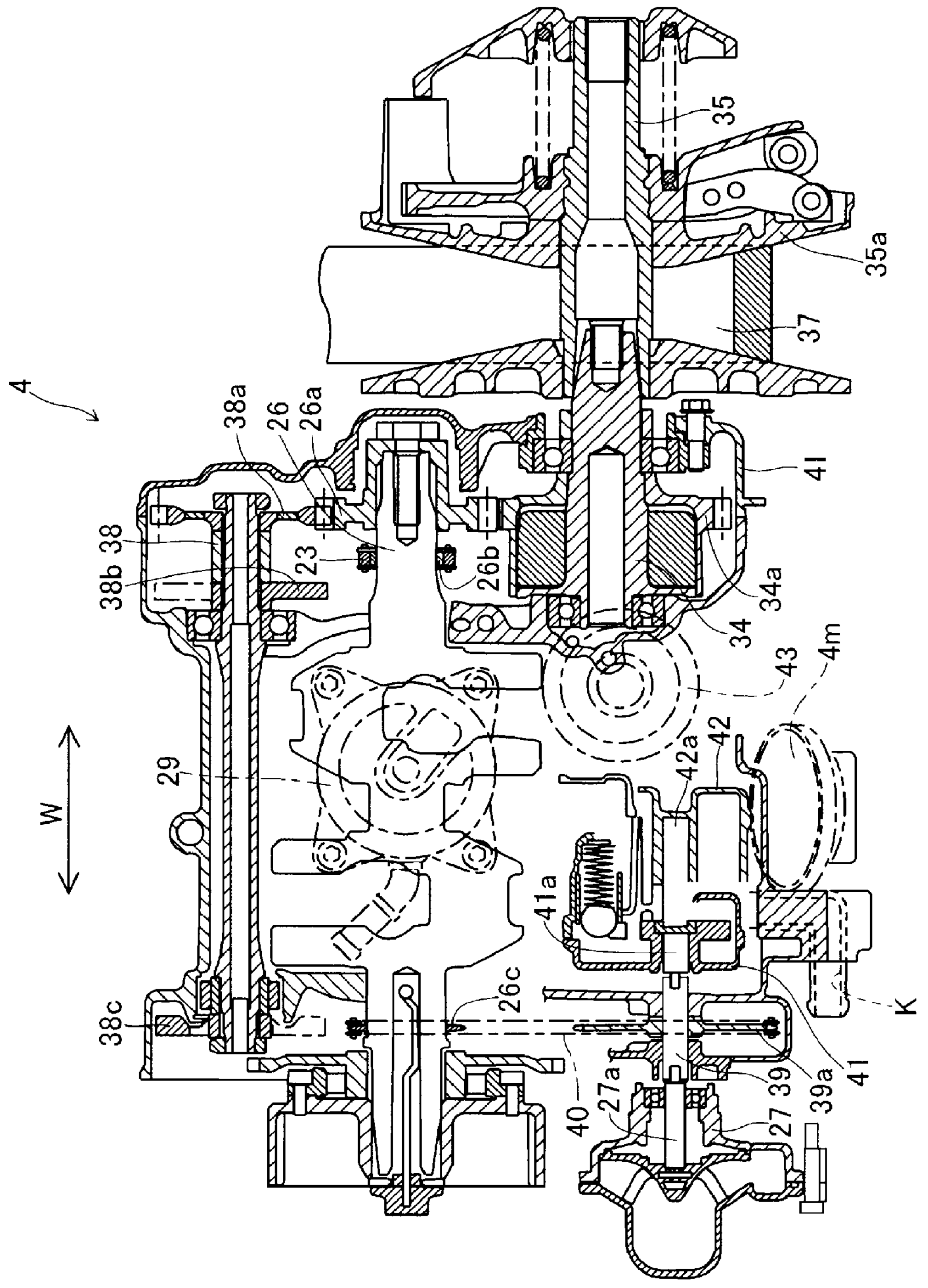
FIG. 12 is a view taken along a line 300-300 of FIG. 5.

Further, the crankshaft 26 is arranged inside of the crankcase portion 41 at a position on the center line L2 of the cylinder 4*g*. As shown in FIG. 12, the crankshaft 26 is provided with a reduction gear 26*a*, a gear 26*b* for the cam chain 23 and a gear 26*c* for the pump. Further, the reduction gear 26*a* is connected to an inner primary shaft 34 byway of a reduction gear 34*a*. Thereby, rotation of the crankshaft 26 can be transmitted to the inner primary shaft 34 by reducing a speed thereof to some degree. Further, the inner primary shaft 34 is projected outside of the crankcase portion 41 and is connected to an outer primary shaft 35. Further, as shown in FIG. 1, a center P4 of the inner primary shaft 34 and the outer primary shaft 35 is arranged on an upper side of the line L3 connecting the center P1 of the crankshaft 26 and the center P2 of the front axle 14*b* and on a front side of the crankshaft 26. Thereby, in comparison with a case of arranging the center P4 of the inner primary shaft 34 and the outer primary shaft 35 on the line L3 connecting the center P1 of the crankshaft 26 and the center P2 of the front axle 14*b* and on the front side of the crankshaft 26, a projecting amount of the inner primary shaft 34 and the outer primary shaft 35 to the front side relative to the crankshaft 26 can be reduced and therefore, the engine 4 can be prevented from being enlarged in a front and rear direction.

Further, as shown in FIG. 12, the outer primary shaft 35 is attached with a primary sheave 35*a* having a continuously variable speed function. As shown in FIG. 1, the rear side of the primary sheave 35*a* is arranged with a secondary shaft 36 having a secondary sheave 36*a* having a continuously variable speed function. Further, the primary sheave 35*a* and the secondary sheave 36*a* are attached with a V belt 37 (refer to FIG. 12) and arranged such that a drive force from the outer primary shaft 35 is transmitted to the secondary shaft 36 by the V belt 37. Further, the drive force from the outer primary shaft 35 transmitted to the secondary shaft 36 is arranged to be transmitted to the front axle 14*b* by way of a speed reducing chain, not illustrated. Thereby, the drive track 14 can be driven at a sufficiently reduced speed.

Further, as shown in FIG. 12, the reduction gear 26*a* is connected to a balancer shaft 38 by way of a balancer shaft drive gear 38*a*. The balancer shaft 38 is provided with balancer weights 38*b* and 38*c* for preventing vibration by rotation of the crankshaft 26 to be spaced apart from the balancer shaft drive gear 38*a* by predetermined distances in an axial direction of the balancer shaft 38. Further, as shown in FIG. 1, the center P5 of the balancer shaft 38 is arranged on the upper side of the line L3 connecting the center P1 of the crankshaft 26 and the center P2 of the front axle 14*b* and at a vicinity of the rear side of the crankshaft 26.

Further, as described above, by arranging the center shaft P3 of the starter motor shaft 33*a* of the starter motor 33 and the center P5 of the balancer shaft 38 on the upper side or the lower side of the line L3 connecting the center P1 of the crankshaft 26 and the center P2 of the front axle 14*b* and on the rear side of the crankshaft 26, the starter motor 33 and the balancer shaft 38 can be prevented from being arranged between the crankshaft 26 and the front axle 14*b* and therefore, the crankshaft 26 can very close to the front axle 14*b*. Thereby, the gravitational center of the engine 4 can be much closer to the front axle 14*b* and therefore, the gravitational center of the engine 4 can close to or at the gravitational center G of the snow mobile 1 arranged at a vicinity of the front axle 14*b*. As a result, the turning capability of the snow vehicle is greatly improved.

Further, as shown in FIG. 5 and FIG. 12, the gear 26*b* for the cam chain 23 is attached with the cam chain 23. Thereby, the drive force from the crankshaft 26 can be transmitted to the cam shafts 21 and 22 (refer to FIG. 5) by way of the cam chain 23.

Further, as shown in FIG. 12, the gear 26*b* for the cam chain 23 and the cam chain 23 are arranged between the balancer weights 38*b* and 38*c* and the balancer shaft drive gear 38*a* in the axial direction of the balancer shaft 38. Thereby, as shown in FIG. 5, the cam chain 23 can be prevented from being brought into contact with the balancer weights 38*b* and 38*c* and the balancer shaft drive gear 38*a* and therefore, the cam chain 23 can be arranged proximate to the balancer shaft 38 in the front and rear direction. Thereby, the engine 4 can be prevented from being enlarged in the front and rear direction.

Further, as shown in FIG. 12, a chain 40 is attached between the gear 26*c* for the pump of the crankshaft 26 and a transmitting shaft gear 39*a* of a transmitting shaft 39. An inner side end portion of the transmitting shaft 39 is directly connected with a feed pump shaft 41*a* of a feed pump 41 and the feed pump shaft 41*a* of the feed pump 41 is connected with a scavenge pump shaft 42*a* of a scavenge pump 42. Further, an outer end portion of the transmitting shaft 39 is directly attached to a water pump shaft 27a of the water pump 27.

Further, as shown in FIG. 5, centers P6 of the scavenge pump shaft 42*a* of the scavenge pump 42, the feed pump shaft 41*a* of the feed pump 41 and the water pump shaft 27*a* of the water pump 27 are coaxially arranged, and arranged on the lower side of the center line L3 connecting the center P1 of the crankshaft 26 and the center P2 of the front axle 14*b* (refer to FIG. 1) and on the front side of the crankshaft 26. Thereby, in comparison with a case of arranging the centers P6 of the scavenge pump shaft 42*a*, the feed pump shaft 41*a* and the water pump shaft 27*a* on the line L3 connecting the center P1 of the crankshaft 26 and the center P2 of the front axle 14*b* and on the front side of the crankshaft 26, the projecting amounts of the scavenge pump shaft 42*a*, the feed pump shaft 41*a* and the water pump shaft 27*a* to the front side relative to the crankshaft 26 can be reduced and therefore, the engine 4 can be prevented from being enlarged in the front and rear direction.

Further, the oil pump including the scavenge pump 42 and the feed pump 41 is provided with a function of reducing friction of and cooling of respective sliding portions inside of the engine 4. Specifically, as shown in FIG. 12, the scavenge pump 42 is provided at a lower portion of a vicinity of the center portion in a vehicle width direction (arrow mark W direction) of the crankcase portion 41. Further, the scavenge pump 42 is provided with a function of supplying oil in an oil pan 4*m* provided on the lower side of the scavenge pump 42 to an oil tank, not illustrated, arranged at the outside of the engine 4 by way of an oil path portion J (refer to FIG. 5). Further, the feed pump 41 is provided with a function of sucking up oil in an oil tank, not illustrated, by way of an oil path portion K and supplying oil to a surrounding of the crankshaft 26 and surroundings of the cam shafts 21 and 22 (refer to FIG. 5) by way of an oil cooler 29, an oil cleaner 43 and a main gallery (oil path), not illustrated. Further, oil supplied to respective portions of the inside of the engine 4 is returned to the oil pan 4m provided at a center of a bottom portion of the crankcase portion 41.

According to the present preferred embodiment, as described above, by providing the cooling water inlet portion 4*h* and the cooling water outlet portion 4*e* respectively connected with the cooling water path portions B and E at the front surface of the engine 4, in comparison with a case of arranging the cooling water inlet portion 4*h* and the cooling water outlet portion 4*e* respectively connected with the cooling water path portions B and E on the rear surface side of the engine 4, the engine 5 can located even closer to the rear of the vehicle. As a result, the gravitational center of the engine 4 can be arranged on the rear side and therefore, the gravitational center of the engine 4 can be made to be proximate to the gravitational center G of the snow mobile 1. As a result, turning capability of the vehicle is greatly improved. Further, by providing the cooling water inlet portion 4*h* and the cooling water outlet portion 4*e* respectively connected with the cooling water path portions B and E at the front surface of the of the engine 4, the cooling water inlet portion 4*h* and the cooling water outlet portion 4*e* can be arranged to be proximate to each other and therefore, the pipes defining the cooling water path portions B, A and E connecting the cooling water inlet portion 4*h* and the cooling water outlet portion 4*e* can be simplified and a structure for cooling the engine 4 can be greatly reduced in size.

Further, according to the present preferred embodiment, by arranging the bypass path including the cooling water path portions E, A, B, C and D which do not pass a cooler (the radiator 30 and the heat exchanger 31) when the water temperature of the cooling water is lower than the predetermined temperature on the front surface side of the engine 4, in comparison with a case of arranging the bypass path including the cooling water path portions E, A, B, C and D on the rear surface side, the engine 4 can be located even closer to the rear of the vehicle. Further, by providing the bypass path including the cooling water path portions E, A, B, C and D which do not pass the cooler on the front surface side of the engine, the bypass path including the cooling water path portions E, A, B, C and D can be arranged close to the cooling water inlet portion 4*h* and the cooling water outlet portion 4*e* and therefore, the pipes defining the bypass path including the cooling water path portions E, A, B, C and D can easily be simplified.

Further, according to the present preferred embodiment, by arranging the intake path 4*c* at the front surface of the engine 4 and arranging the exhaust path 4*d* at the rear surface of the engine 4, the intake pipe 17 and the air cleaner 18 connected to the intake path 4*c* can be more easily arranged on the front side of the engine 4 and therefore, in comparison with a case of arranging the intake pipe 17 and the air cleaner 18 at the rear surface side of the engine 4, the engine 4 can further be arranged toward the rear side more easily.

Further, according to the present preferred embodiment, by arranging the cooling water inlet portion 4*h* of the engine 4 such that cooling water flows between the center lines L2 of the two cylinders 4*g* in the direction of alignment of the two cylinders 4*g*, cooling water can be more easily distributed uniformly to side portions of the two cylinders 4*g* and therefore, the two cylinders 4*g* can more easily be uniformly cooled.

Further, according to the present preferred embodiment, by arranging the radiator 30, the water pump 27 and the oil cooler 29 on the front surface side of the engine 4, in comparison with the case of arranging the radiator 30, the water pump 27 and the oil cooler 29 on the rear surface side of the engine 4, the engine 4 can be easily located closer to the rear of the vehicle.

Further, according to the present preferred embodiment, by arranging the water pump 27 to be transmitted with the drive force from the crankshaft 26 by way of the chain 40, the crankshaft 26 can be made to define a drive source of the water pump 27 and therefore, in comparison with a case of separately providing a drive source for driving the water pump 27, the number of parts can be reduced and a lightweight and small-size engine 4 can be achieved.

Further, according to the present preferred embodiment, by arranging the thermostat 28, the reservoir tank 32, the radiator 30 and the water pump 27 on the right side in the running direction, the thermostat 28, the reservoir tank 32, the radiator 30 and the water pump 27 can be arranged close to each other and therefore, the pipes defining the cooling water path portions I, F and A respectively connecting the thermostat 28, the reservoir tank 32, the radiator 30 and the water pump 27 can easily be simplified and the structure for cooling the engine 4 can easily and significantly reduced in size.

The preferred embodiments disclosed herein are an exemplification in all the respects and are not to be regarded as restrictive. The range of the invention is indicated not by the above-described explanation of the preferred embodiments but by the scope of claims and includes all the changes within the significance and the range of equivalency with the scope of claims.

For example, although according to the above-described preferred embodiments, the snow mobile is shown as an example of the snow vehicle, the present invention is not limited thereto but is applicable also to snow vehicles other than the snow mobile so far as the snow vehicle is a snow vehicle having a cooling water path for cooling an engine.

Further, although according to the above-described preferred embodiments, an explanation has been given of an example of using the engine including the four stroke engine, the present invention is not limited thereto but an engine including a two stroke engine may be used.

Further, although according to the above-described preferred embodiments, an explanation has been given of an example of providing the two cylinders in the engine, the present invention is not limited thereto but one cylinder may be provided in the engine, or three or more cylinders may be provided therein.

Further, although according to the above-described preferred embodiments, an explanation has been given of an example of providing the intake path on the front surface side of the engine and providing the exhaust path on the rear surface side of the engine, the present invention is not limited thereto but the exhaust path may be provided on the front surface side of the engine and the intake path may be provided on the rear surface side of the engine.

Further, although according to the above-described preferred embodiments, there has been shown an example of transmitting the drive force from the crankshaft to the water pump and the like by way of the chain, the present invention is not limited thereto but the drive force of the crankshaft may be transmitted to the water pump by way of a gear or the like.

While the present invention has been described with respect to preferred embodiments, it will be apparent to those skilled in the art that the disclosed invention may be modified in numerous ways and may assume many preferred embodiments other than those specifically set out and described above. Accordingly, it is intended by the appended claims to cover all modifications of the present invention which fall within the true spirit and scope of the present invention.

What is claimed is:

1. A snow vehicle comprising:

an engine including a cooling water jacket, a cooling water inlet portion, and a cooling water outlet portion;

a track belt arranged on a rear side of the engine, the track belt being wound around a front axle arranged to receive a drive force from the engine;

a shaft arranged to transmit the drive force from the engine to the front axle, the shaft arranged behind the engine and above the front axle; and a cooling water path arranged to cool the engine, the cooling water path including a cooler arranged to cool cooling water in the cooling water path, the cooler including a first portion interposed between the engine and the front axle and a second portion disposed above the front axle and interposed between the shaft and the front axle; wherein the engine includes a front surface with respect to a forward running direction of the vehicle that extends substantially perpendicular to the forward running direction; and the cooling water inlet portion and the cooling water outlet portion are directly connected to the front surface of the engine, and are connected to the cooling water jacket and the cooling water path on a front surface side located in front of the front surface of the engine with respect to the forward running direction of the vehicle.

2. The snow vehicle according to claim 1, further including a thermostat connected to the cooling water path and arranged to control a path of the cooling water according to a temperature of the cooling water, wherein the cooling water path includes a bypass path in which the cooling water is controlled to pass therethrough by the thermostat when the water temperature of the cooling water is lower than a predetermined temperature and does not pass through the cooler, and the bypass path of the cooling water path is arranged on the front surface side of the engine.

3. The snow vehicle according to claim 1, wherein the engine further includes a cylinder and an intake path and an exhaust path connected to the cylinder, wherein the intake path is arranged on the front surface side of the engine and the exhaust path is arranged on a rear surface side of the engine.

4. The snow vehicle according to claim 1, wherein the engine further includes a plurality of cylinders, wherein the cooling water inlet portion of the engine is arranged such that the cooling water flows between axis lines of predetermined cylinders in a direction of alignment of the plurality of cylinders.

5. The snow vehicle according to claim 1, further including a reservoir tank connected to the cooling water path, the engine further includes a cylinder and an engine path connected to the cylinder and arranged on the front surface side of the engine, wherein the reservoir tank is arranged on an upper side of the cooling water path, and the cooling water outlet portion is arranged on a lower side of the cooling water path.

6. The snow vehicle according to claim 5, wherein the engine path is an intake path.

7. The snow vehicle according to claim 1, further comprising a radiator connected to the cooling water path, wherein the radiator is arranged on the front surface side of the engine.

8. The snow vehicle according to claim 1, wherein the engine further includes a water pump arranged to supply the cooling water to the cooling water path, wherein the water pump is arranged on the front surface side of the engine.

9. The snow vehicle according to claim 8, wherein a portion of the cooling water path connecting the water pump and the cooling water inlet portion of the engine is arranged on the front surface side of the engine.

10. The snow vehicle according to claim 8, wherein the water pump is arranged on an outer side of the engine in a vehicle width direction.

11. The snow vehicle according to claim 8, wherein the engine further includes a crankshaft, and wherein the water pump is transmitted with a drive force from the crankshaft.

12. The snow vehicle according to claim 1, further including an oil cooler connected to the cooling water path, wherein the oil cooler is arranged on the front surface side of the engine.

13. The snow vehicle according to claim 1, wherein the engine further includes a cylinder and the cooling water jacket is arranged at least at an upper portion and a side portion of the cylinder, wherein the cooling water outlet portion of the engine is provided on an upper portion of the cooling water jacket, cooling water supplied from the cooling water inlet portion arranged on the front surface of the engine to an inner portion of the engine is passed from a lower portion to the upper portion of the cooling water jacket and discharged to the cooling water path by way of the cooling water outlet portion, and the cooling water passing from the lower portion to the upper portion of the cooling water jacket is restricted such that an amount of the cooling water passing through a rear portion of the cooling water jacket becomes larger than an amount of the cooling water passing through a front portion of the cooling water jacket.

14. The snow vehicle according to claim 13, wherein the front portion and the rear portion of the cooling water jacket are respectively provided with a first passing hole and a second passing hole connecting the upper portion and the lower portion of the cooling water jacket, and wherein the second passing hole has an area larger than that of the first passing hole.

15. The snow vehicle according to claim 1, wherein a top of the engine is arranged to be inclined toward a rear side of the vehicle.

16. The snow mobile according to claim 1, wherein the engine is a four stroke engine.

* * * * *